E. SWAIN.
Shaft-Couplings.
No. 140,600. Patented July 8, 1873.
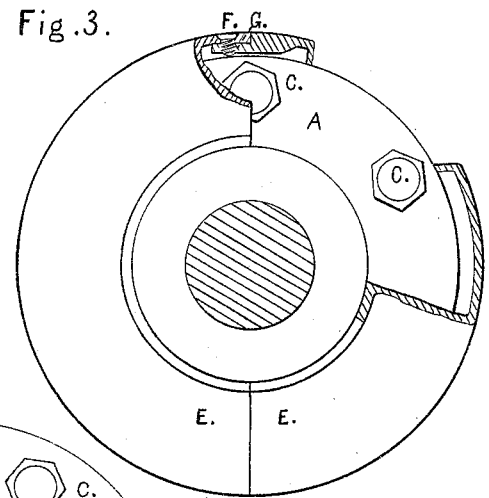
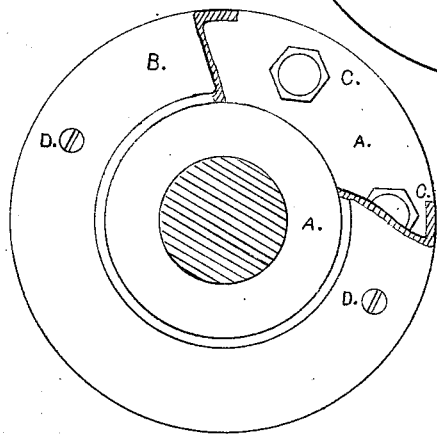
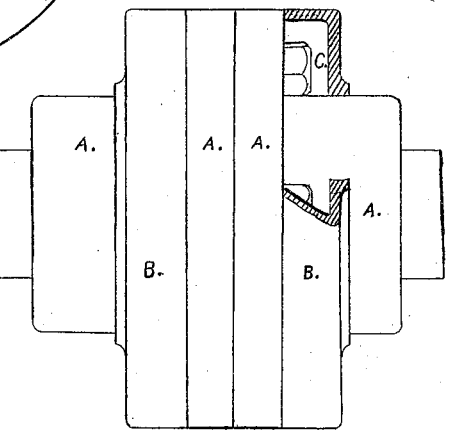
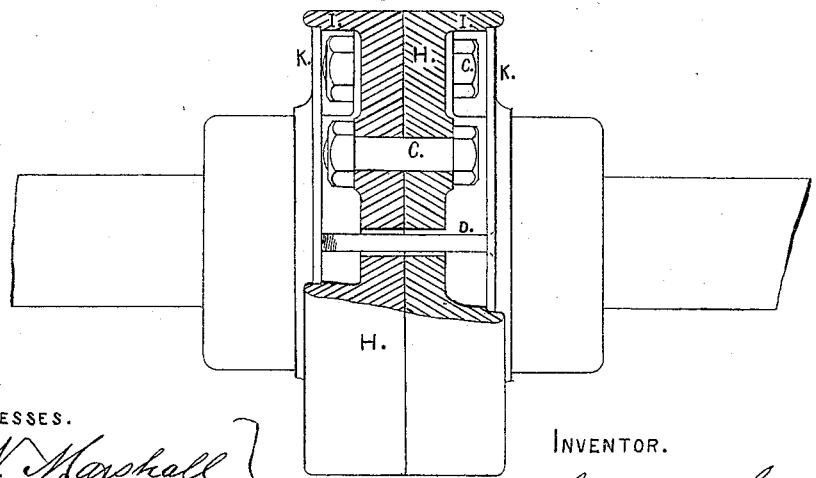
WITNESSES.
J. N. Marshall
G. S. Hadley
INVENTOR.
Edwin Swain

UNITED STATES PATENT OFFICE.

EDWIN SWAIN, OF CHELMSFORD, MASSACHUSETTS.

IMPROVEMENT IN SHAFT-COUPLINGS.

Specification forming part of Letters Patent No. 140,600, dated July 8, 1873; application filed September 12, 1872.

*To all whom it may concern:*

Be it known that I, EDWIN SWAIN, of Chelmsford, in the county of Middlesex and State of Massachusetts, have invented certain Improvements in Couplings for Power Shafting, of which the following is a specification:

My invention relates to the combination, with the coupling of shafts, of a shell covering, in such a manner as to present a smooth surface, and to be readily removable when desired; the object of my invention being to prevent the collection of dirt, and to avoid the danger arising from the revolving bolt-heads and nuts, when exposed, as in couplings of the ordinary form.

Figure 1 is an end view of the coupling with a shell covering embodying my invention. Fig. 2 is a side view of the same.

A, Figs. 1 and 2, are couplings of the kind known as faced couplings or flange-couplings, the halves of the coupling being bolted together through the flanges by the bolts C C. B B are the shells, fitting on the hubs and against the flanges, and covering the bolt-heads and nuts. The shells are held in position by two screws, D D, which pass loosely through the coupling-flanges from one shell to the other. A, Fig. 3, is the coupling; E E, the shells, formed in segments, fitted on the hubs, and covering the coupling-flanges. The shells are connected by screws F F, which pass through one shell, and are screwed into the projections G G on the other shell. This arrangement of the shell covering permits its being applied to couplings when in position. H H, Fig. 4, is a coupling having rims I I cast on the flanges. The covering is completed by the disks K K, fitted on the hubs, and resting on shoulders on the rims I I. The disks are secured by screws D, as in Figs. 1 and 2.

The faced coupling of the general form here shown is largely used, and very generally approved, for all the uses of a coupling-joint; but the grave objection which the projections of the bolt-heads and nuts present in their liability when revolving to catch loose belting and other objects, and the collection of dirt and difficulty of cleaning caused by these projections, has resulted in the introduction of less approved forms of coupling, and less satisfactory methods of connecting them, but which are partially free from the objections of the form of coupling here shown; for instance, couplings have been connected by screws, which pass through one flange and screw into the other—a method inconvenient and expensive in the process of making, and especially objectionable in connecting and disconnecting.

The application of a shell covering, as here shown, permits the coupling to be made in the most approved form, and presents at the same time the desired smoothness of surface.

I do not claim, broadly, the application of a shell or sleeve to cover the bolts of a shaft-coupling, nor do I claim flanged couplings secured by bolts of the form described.

I claim—

1. The combination, with the flanged couplings A, secured by bolts through the flanges, of the shells B B covering the bolts of the coupling, and secured substantially as described, the whole arranged substantially as and for the purposes specified.

2. The shells B B, formed of an annular disk with a cylindrical rim attached, in combination with the screws D D, as and for the purpose described.

EDWIN SWAIN.

Witnesses:
J. N. MARSHALL,
C. S. HADLEY.